United States Patent
Belgi et al.

(10) Patent No.: US 12,518,040 B2
(45) Date of Patent: Jan. 6, 2026

(54) METHOD FOR CLASSIFYING AND CONTROLLING TRANSMISSION OF A FILE

(71) Applicant: Varonis Systems, Inc., New York, NY (US)

(72) Inventors: Amir Belgi, Ra'anana (IL); Ron Sneh, Atlit (IL); John Eugene Neystadt, Kfar-Saba (IL); Orr Kadec, Haworth, NJ (US)

(73) Assignee: VARONIS SYSTEMS, INC., New York, NY (US)

( * ) Notice: Subject to any disclaimer, the term of this patent is extended or adjusted under 35 U.S.C. 154(b) by 119 days.

(21) Appl. No.: 18/388,588

(22) Filed: Nov. 10, 2023

(65) Prior Publication Data

US 2025/0156567 A1    May 15, 2025

(51) Int. Cl.
  *G06F 21/62*    (2013.01)
  *G06F 16/75*    (2019.01)
  *G06F 16/783*   (2019.01)

(52) U.S. Cl.
  CPC .......... *G06F 21/6218* (2013.01); *G06F 16/75* (2019.01); *G06F 16/784* (2019.01)

(58) Field of Classification Search
  None
  See application file for complete search history.

(56) References Cited

U.S. PATENT DOCUMENTS 8,578,507 B2   11/2013  Faitelson et al.
10,037,358 B2   7/2018  Faitelson et al.

(Continued)

FOREIGN PATENT DOCUMENTS

CN   109684903 A   4/2019
CN   111711777 A   9/2020

(Continued)

OTHER PUBLICATIONS

Hanu, L. et al., "Language as the Medium: Multimodal Video Classification through text only", Arxiv.org, Cornell University Library, Sep. 19, 2023, pp. 1-4.

(Continued)

*Primary Examiner* — Brandon Hoffman
(74) *Attorney, Agent, or Firm* — COATS & BENNETT, PLLC

(57) ABSTRACT

A method and system for classifying a video file within an environment in which the file is located and when a file is classified as sensitive, controlling transmission of the file outside the environment. Classifying the video comprises analysing, using at least one machine learning model, the video to recognise any individuals in the video; obtaining a transcript of any speech in the video and generating, using the analysis, obtained transcript and a database of individuals linked to the environment, a labelled transcript which identifies each individual linked to the environment that is in the video. Information about each identified individual may be obtained from a connected database. A first generative AI model generates a text-based summary of the video by using the labelled transcript and information about identified individuals as prompts. A second generative AI model then determines a sensitivity classification of the video using the generated text-based summary.

20 Claims, 6 Drawing Sheets

(56) References Cited

U.S. PATENT DOCUMENTS

| | | | |
|---|---|---|---|
| 10,296,596 B2 | 5/2019 | Faitelson et al. | |
| 10,970,532 B1 | 4/2021 | Song et al. | |
| 2009/0265780 A1 | 10/2009 | Korkus et al. | |
| 2017/0280100 A1 | 9/2017 | Hodge | |
| 2020/0402511 A1 | 12/2020 | Anbarjafari et al. | |
| 2021/0350911 A1 | 11/2021 | Amthor et al. | |
| 2021/0390957 A1 | 12/2021 | Wexler et al. | |
| 2023/0119556 A1 | 4/2023 | Uprit | |
| 2023/0297778 A1* | 9/2023 | Can | G06F 16/345 |
| 2023/0320642 A1* | 10/2023 | Lin | G06F 40/30 |

FOREIGN PATENT DOCUMENTS

| | | |
|---|---|---|
| CN | 112016121 A | 12/2020 |
| EP | 4016355 A2 | 6/2022 |
| IN | 106550241 A | 3/2017 |
| WO | 2021027955 A1 | 2/2021 |

OTHER PUBLICATIONS

Li, B. et al., "SEED-Bench: Benchmarking Multimodal LLMs with Generative Comprehension", Arxiv.org, Cornell University Library, Aug. 2, 2023, pp. 1-14.

\* cited by examiner

METHOD FOR CLASSIFYING AND CONTROLLING TRANSMISSION OF A FILE

FIELD

The present application generally relates to a method and system for classifying a file within an environment in which the file is located and when a file is classified as sensitive, preferably controlling transmission of the file outside the environment. The file may be a video file.

BACKGROUND

Controlling transmission of sensitive data outside an environment in which the file is located is an important aspect of data security. As an example, the environment may be an enterprise network which may for example for comprise at least one central server and a plurality of user electronic devices connected to the central server. The user electronic devices are typically used by users who are directly associated with the enterprise environment such as employees. Files may be obtained in many different ways, for example by creating files directly on the user electronic devices or by downloading files to the user electronic devices from the central server and so on. Determining the sensitivity of the files located within the environment is required for data security and allows any files which have been labelled as sensitive to be handled differently to those which have been labelled as non-sensitive. For example, when a file is classified as sensitive, an attempted transmission of the file from the user electronic devices to an application or device which is not within the enterprise network can be controlled to ensure that data security is maintained within the environment.

The applicant has recognised that the sensitivity of a file is linked to the environment within which the file is located, and a more accurate classification is dependent on using the large volume of data within the environment.

SUMMARY

In a first approach of the present techniques, there is provided a computer-implemented method for determining a sensitivity classification of a video, the method comprising: receiving, at a central system from a connected electronic device, a video; analysing, using at least one machine learning model, the video to recognise any individuals in the video; obtaining a transcript of any speech in the video; generating, using the analysis, obtained transcript and a database of individuals linked to the environment, a labelled transcript which identifies each individual linked to the environment that is in the video; obtaining, from a database which is connected to the central system, information about each identified individual; generating, using a first generative artificial intelligence, AI, model, a text-based summary of the video by using the labelled transcript and information about each identified individual as prompts to the first generative machine learning model; determining, using a second generative AI model, a sensitivity classification of the video using the text-based summary; and outputting the determined sensitivity classification.

In a second approach of the present techniques, there is provided a central system for determining a sensitivity classification of a video. The central system comprises an interface for connecting the central system to an electronic device and through which a video is receivable from the electronic device; at least one machine learning model for analysing the video to recognise any individuals in a received video; a transcript module for obtaining a transcript of any speech in the received video and for generating a labelled transcript using the obtained transcript, analysis from the at least one machine learning model and data from a database of individuals linked to the environment, wherein the labelled transcript identifies each individual linked to the environment that is in the video; a first generative artificial intelligence, AI, model for generating a text-based summary of the video, wherein the labelled transcript and information about each identified individual are used as prompts to the first generative machine learning model when generating the text-based summary and wherein the information about each identified individual is obtained from a database which is connected to the central system; and a second generative AI model for generating a sensitivity classification of the video using the text-based summary generated by the first generative AI model.

In both approaches, each of the first and second generative AI models may be fine-tuned as described below. The features below also apply to both approaches.

The text-based summary may also be termed a description of the video. The second generative AI model is preferably a large language model (LLM) and the text-based summary is in a format which is suitable to input into the LLM. The first generative AL model may be a more general model, for example a generative pre-trained transformer such as GPT-4. Prompt engineering may be used to improve the results when generating the text-based summary and/or the sensitivity classification. For example, the method may further comprise using optical character recognition to extract any text from frames of the video and/or obtaining metadata related to the video. The extracted text and/or metadata may be used as further prompts when generating the text-based summary of the video.

Prior to using the first generative AL model, the first generative AI model may have been trained (e.g. fine-tuned) using a training dataset which comprises example videos and the text-based summaries for the example videos. The method may further comprise selecting at least one text based summary and corresponding example video from the training dataset as a further prompt when generating the text-based summary of the video using the first generative AI model. Similarly, prior to using the second generative AL model, the second generative AI model may have been trained using a training dataset which comprises example text-based summaries and the classifications for the example text-based summaries. The method may further comprise selecting at least one text-based summary and corresponding classifications from the training dataset as a further prompt when generating the sensitivity classification for the video using the second generative AI model. The selected example from each training dataset may be used as a prompt by using retrieval augmented generation (RAG).

The training datasets for the first and second generative AI models may be stored in databases from which prompts may be selected. The databases for the first and second generative AI models may be vector databases which contain vector representations of the data within each dataset. The database for selecting prompts for the first generative AI model may be termed a description database. The database for selecting prompts for the second generative AI model may be termed a security database. The database may be kept updated with new examples, for example when a text-based summary and a classification for a received video are generated, they may be stored in the appropriate databases and subsequently selected as prompts.

Selecting a prompt to use with the second generative AI model may be done by: comparing the generated text-based summary to a plurality of example text-based summaries in the security database; identifying at least one example from the plurality of example text-based summaries which is similar to the generated text-based summary; and selecting the identified at least one example and its classification to form the prompt. Identifying the at least one similar example may be done using any suitable technique which may include semantic similarity and/or key-word based filtering. Similarly, selecting a prompt to use with the first generative AI model may be done by: comparing the video to a plurality of example videos in the description database; identifying at least one example from the plurality of example videos which is similar to the received video; and selecting the identified at least one example video and its corresponding text-based summary as the prompt.

The method may further comprise determining, using the obtained text-based summary, a sensitivity classification of the video comprises using a rules-based engine to analyse the text-based summary and determine a sensitivity classification, wherein rules of the rules-based engine are predefined.

Analysing, using at least one machine learning model, may comprise analysing an image portion of the video using a face recognition model to recognise faces of any individuals in the video. Analysing an image portion of the video to recognise faces may comprise: detecting, using the face recognition model, faces within the video; and generating, for each detected face, an image feature representation. The method may further comprise comparing the generated image feature representation for each detected face with image feature representations in an image database of individuals linked to the environment and outputting a face identifier when the generated image feature representation matches an image feature representation in the image database.

Alternatively, or additionally, analysing, using at least one machine learning model, may comprise analysing, using a sound recognition model, an audio portion of the video to recognise individuals who are speaking in the video by: detecting, using the sound recognition model, speech segments within the video; and generating, for each speech segment, an audio feature representation. The method may further comprise comparing the generated audio feature representation for each speech segment with audio feature representations in the database of individuals linked to the environment. When the generated audio feature representation matches an audio feature representation in the database of individuals, an identification of the individual corresponding to the matching audio feature representation may be output.

In other words, the at least one machine learning model may comprise a sound recognition model and/or a face recognition model. Optionally, other machine learning models may be used, for example a sound signature model and/or a sound tone model.

The method may further comprise obtaining a transcript of any speech in the video by using a speech-to-text model to generate a transcript from the received video. If a transcript is available from the application which generated the video, the transcript may be obtained automatically.

The environment may be a workplace, for example a network of user electronic device connected to the central system, wherein each user is an employee. The sensitivity classification may be dependent on the nature and details of the environment. An organisation database may be created to store such information. The method may further comprise obtaining, from the organisation database, information about each identified individual by obtaining information on any one or more of: a relationship of the identified individual to the environment; a role of the identified individual in the environment; and a name of the identified individual.

When a video is classified as sensitive, the transmission of the video within and outside the environment may need to be controlled or restricted.

Thus, according to another approach of the present techniques, there is provided a computer-implemented method for controlling transmission of a video outside of an environment, the method comprising: receiving, at a central system in the environment, a video from an electronic device which is connected to the central system; analysing, using at least one machine learning model, the video to recognise any individuals in the video; obtaining a transcript of any speech in the video; generating, using the analysis, obtained transcript and a database of individuals linked to the environment, a labelled transcript which identifies each individual linked to the environment that is in the video; obtaining, from a database which is connected to the central system, information about each identified individual; generating, using a first generative artificial intelligence, AI, model, a text-based summary of the video by using the labelled transcript and information about each identified individual as prompts to the first generative machine learning model; determining, using a second generative AI model, a sensitivity classification of the video using the text-based summary; and controlling transmission of the video based on the determined sensitivity classification.

The features described above in relation to determining the sensitivity classification apply equally to controlling transmission.

Controlling transmission may comprise blocking transmission of the video outside of the environment. Alternatively, controlling transmission may comprise automatic editing of the video prior to transmission and instructions to a user to edit the video. Editing may comprise any suitable technique for removing sensitive material such as blurring one or more frames of the video; deleting one or more frames of the video; muffling all or part of the audio portion of the video; and deleting all or part of the audio portion of the video. In the context of controlling transmission, the method may comprise receiving a video when the video is to be transmitted outside of the environment. For example, receiving a video that is to be transmitted via any of: instant messaging; email; upload to an external platform; and upload to a social media platform.

The detail above relates to a video but it will be appreciated that the method and system above may be adapted for any type of file. According to another technique, there is described a computer-implemented method for determining a sensitivity classification of a file, the method comprising: receiving, at a central system, a file from an electronic device which is connected to the central system and forms an environment within which the file is located; analysing the file to identify any individuals connected with the file; obtaining, from a database which is connected to the central system, information about any identified individual; generating, using a first generative artificial intelligence, AI, model, a text-based summary of the file by using the information about each identified individual as a prompt to the first generative machine learning model; determining, using a second generative AI model, a sensitivity classification of the file using the text-based summary; and outputting the determined sensitivity classification.

The electronic device may be any one of: a smartphone, tablet, laptop, computer or computing device. It will be understood that this is a non-exhaustive and non-limiting list of example electronic devices. The central system may be provided on a server and the terms are used interchangeably. It will be appreciated that the functionality of the server may be distributed over multiple devices. The electronic device and central system form a connected environment within which the file and/or video are located.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

BRIEF DESCRIPTION OF THE DRAWINGS

Implementations of the present techniques will now be described, by way of example only, with reference to the accompanying drawings, in which.

DETAILED DESCRIPTION OF THE DRAWINGS

We describe a method and system for classifying a file and when a file is classified as sensitive, preferably controlling transmission of the file outside an environment in which the file is located. The file may be a video file and in this case classifying the video may comprise generating a labelled transcript which identifies each individual linked to the environment that is in the video. Information about each identified individual may be obtained from a database which is connected to the central system. A first generative AI model may then be used to generate a text-based summary of the video by using the labelled transcript and information about each identified individual as prompts. A second generative AI model may then be used to determine a sensitivity classification of the video using the generated text-based summary. For both models, additional prompts selected from appropriate databases may be used.

Figure 1:
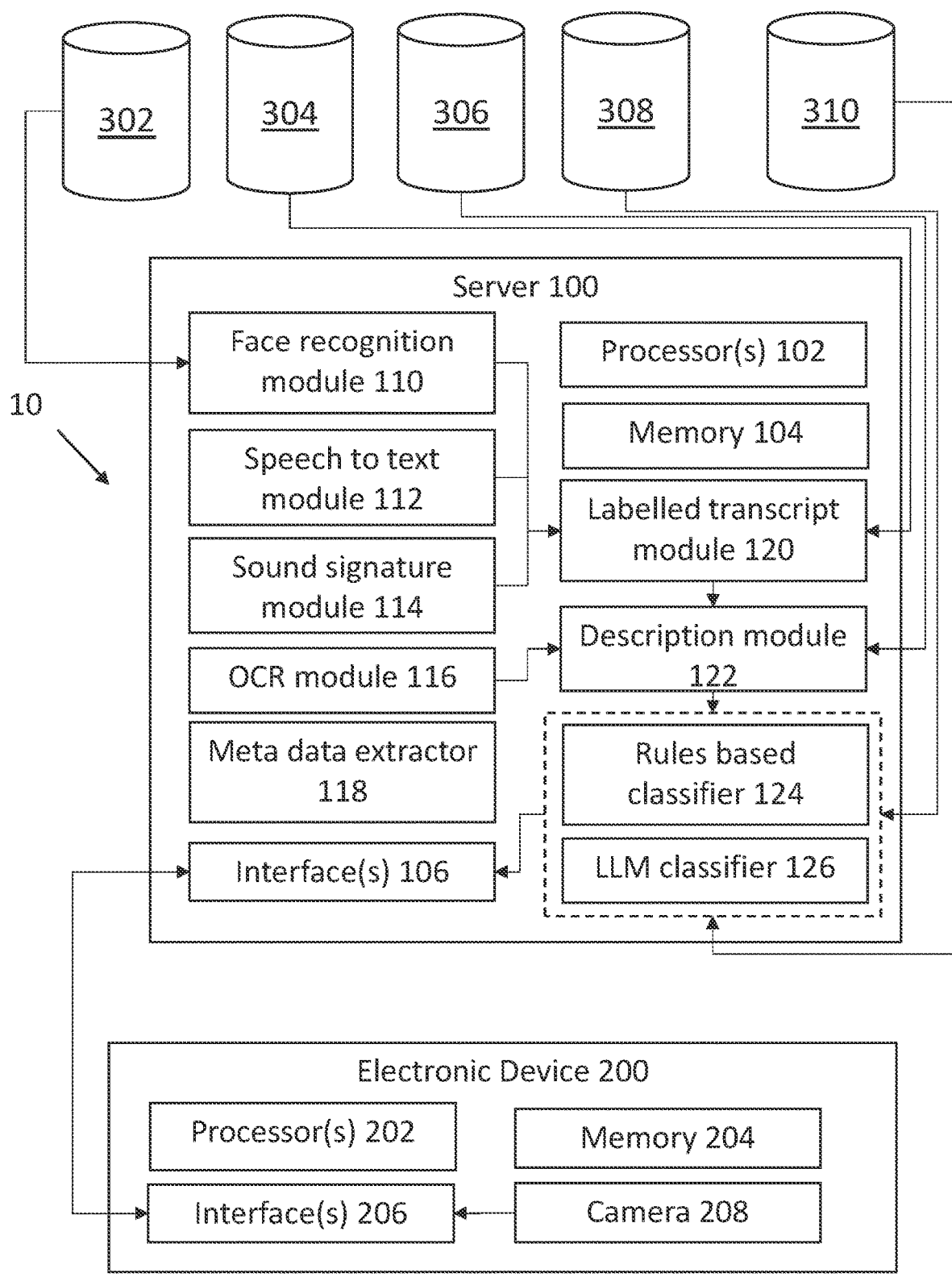
FIG. 1 is a block diagram of a system for classifying and then controlling transmission of a file outside of an environment.

FIG. 1 is a block diagram of an environment 10 in which a video has been obtained by an electronic device 200. The video may have been captured by the electronic device 200, for example using a camera on the electronic device, or may have been obtained, for example downloaded, from another device which is located within or outside the environment. As explained in more detail below, a sensitivity label is applied to the video to determine how to handle the video, particularly how to control any transmission of the video outside the environment.

The environment comprises a central system 100 which may be connected to a plurality of electronic devices 200. The environment may be defined by the network of the central system and connected electronic devices as well as any users associated with the network. The central system may be used to classify the video and to optionally control any transmission of the video. The central system may be provided on a server and the terms are used interchangeably. Only one server 100 and one electronic device 200 are shown in FIG. 1 for the sake of simplicity. It will be appreciated that the functionality of the server 100 may be distributed over multiple devices and that there may be a plurality of electronic devices associated with multiple users. The system also comprises a plurality of databases 302, 304, 306, 308, 310 for storing different types of data as explained in more detail below. The databases are shown as separate databases, but it will be appreciated that the data stored in one or more of the databases can be combined into a single database and similarly that the data may be stored in more than the four databases depicted here for simplicity.

The server 100 comprises: at least one processor 102 coupled to memory 104 and at least one interface 106. The server 100 communicates with the electronic device 100, for example using one of the interfaces 106. Any suitable form of communication may be used, e.g. wireless or wired, and together the electronic device(s) and server may be considered to form a network or an environment. Each electronic device 200 comprises: at least one processor 202 coupled to memory 204, at least one interface 206 (for example for communicating with the server 100) and a camera 208 for capturing a video. There may also be interfaces for communicating with a user of the electronic device, such as a display, an input mechanism, a microphone, a speaker, and so on. It will be appreciated that there may be other standard components in the server and/or electronic devices which are omitted for clarity.

The server and/or electronic device processors may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor may be an entirely hardware embodiment, an entirely software embodiment, or an embodiment combining software and hardware aspects. The one or a plurality of processors in the server control the processing of the input video in accordance with the various modules and models described in more detail below. These various modules may comprise operating rules or artificial intelligence (AI) models which may be stored in the memory which may be non-volatile memory and/or volatile memory.

The server 100 comprises a plurality of modules (which may also be termed models) for analysing a video which is received from each electronic device 200. The video may be uploaded to the server 100 and input into one or more of the following modules: face recognition module 110, speech to text module 112, sound signature module 114, OCR module 116 and meta data extractor 118. Each of the modules generates an output and some of these outputs can be combined as inputs to other modules in the server 100. There may be other dedicated modules which are omitted for simplicity, for example there may be a sound tone module. When generating an output, some of the modules may use information in one or more of the databases.

In this example, the face recognition module 110 generates on output which may be termed individual appearance, the speech to text module 112 generates a transcript of the video and the sound signature module 114 generates a sound signature record. When used, the sound tone module generates an output indicative of a sentiment or tone in the detected speech. Some or all of these outputs: individual appearance, transcript, sound signature and sound tone may then be input to the labelled transcript module 120 to create a transcript which identifies/labels any individuals who are speaking within the video and which may also label the sentiment (e.g. angry, calm, sad) of the individual speaking. The face recognition module 110 may use information from an image database 302 in which images of individuals within the environment have been stored. The labelled transcript module 120 may use information from an audio database 304 in which sound signatures of individuals within the environment have been stored. It will be appreciated that other modules could be used to identify the individuals within the video.

The OCR module 116 processes the video and outputs details of any text which is visible. The text which is output is not a transcript but is the text which can be extracted from individual image frames of the video. Any suitable, standard OCR module may be used for example, Convolutional Neural Networks (CNNs) or LSTM (Long Short-Term Memory) networks. The text and the labelled transcript from the labelled transcript module 120 are then input to a description module 122 together with the video itself. The description module 122 generates a description of the video and any objects within the video. The description may be a text-based summary of the video and the terms may be used interchangeably. The description may be generated by a generative-AI model which has been fine-tuned as described below. Merely as examples, the generative-AI model may be any multi-modal generative AI model such as a generative pre-trained transformer like GPT-4 (described for example in the GPT-4 technical report published by OpenAI) or miniGPT-4 which is built on top of BLIP (Bootstrapping language-image pre-training) and LLaMA and is described for example in "MiniGPT-4: Enhancing Vision-Language Understanding with Advanced Large Language Models" by Zhu et al published in April 2023 (arXIV:2304.10592v1). The description module 122 may use information from a description database 306 to generate the description.

The output description from the description module 122 is input together with the labelled transcript from the labelled transcript module 120 to a LLM classifier 126. Thus, the text-based summary must be suitable for input into a large language model and may be simply be text. The LLM classifier 126 may use information from a security database 310 to apply a classification label to the received video. The LLM classifier may use any suitable model, e.g. a generative-AI model such as LLAMA mentioned above. There may also be a rules based classifier 124 which applies a separate classification label to the video using for example data from an organisation database 308. The two classifications may be used to determine an overall classification for the video and thus as shown by the dashed line may be considered to form a fused classifier. The classification may be sent from the server 100 to the electronic device 200 to be displayed to a user. As explained in more detail below, the classification may be used to block the transmission of the video from the electronic device 200 to any other devices which are not within the network (environment) or to edit the video before such a transmission.

Figure 2:
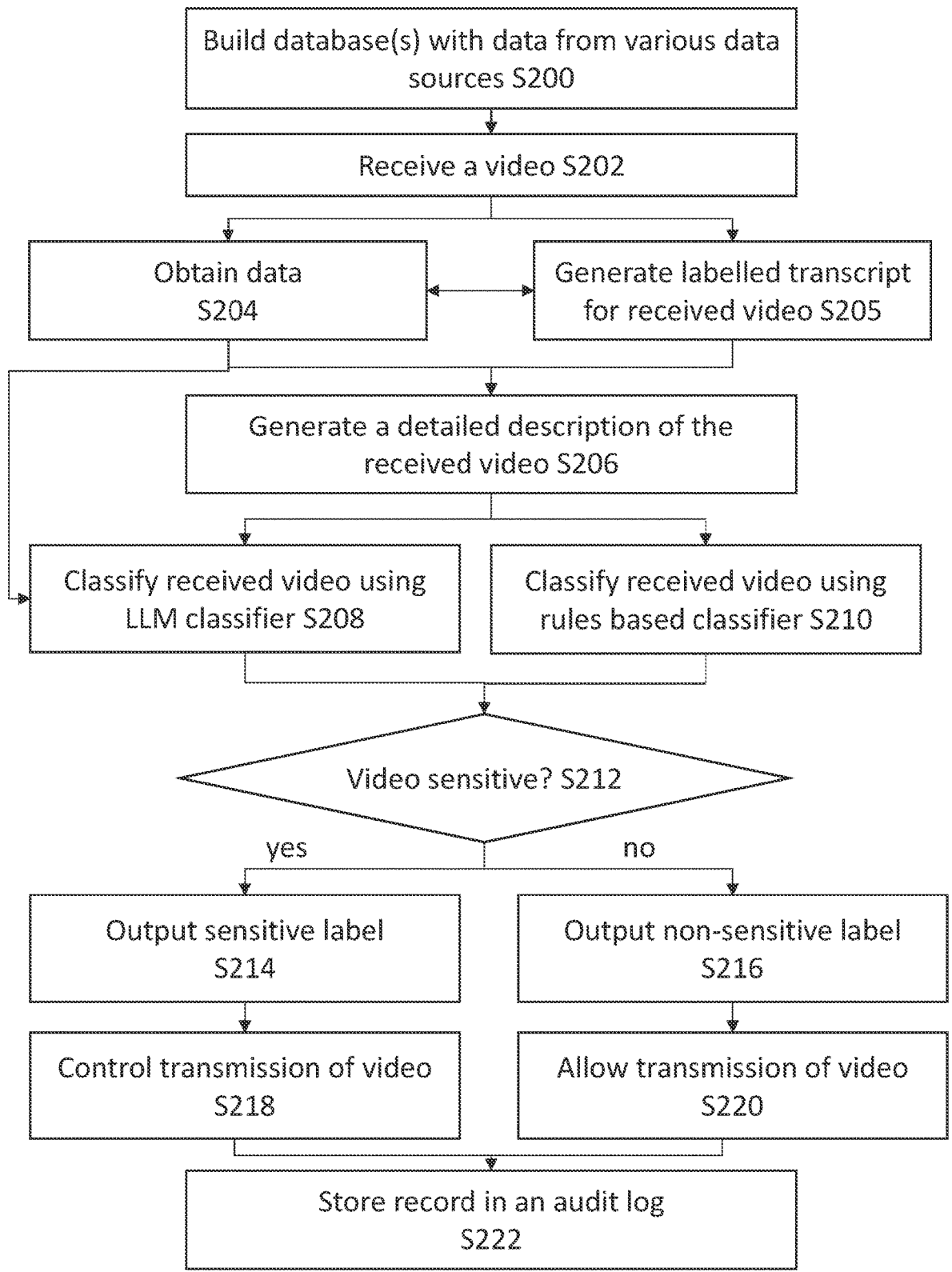
FIG. 2 is a flowchart of one method to process a file using the system of FIG. 1.

FIG. 2 is a flowchart illustrating the steps of using a system shown in FIG. 1 to classify a video and optionally control transmission of the video. The first step S200 is to build the databases which are required to carry out the method. The first step S200 may be considered a pre-processing step but it is noted that the data is collected at regular intervals and thus the databases are kept updated.

For example, referring back to FIG. 1, the organisation database 308 may be built by collecting data from identity providers and CRM systems, examples include Active Directory, Azure Active Directory, Okta, Salesforce, Hubspot, and Microsoft Dynamics 365. The organisation database comprises details which are relevant to the environment of the organisation such as names of individuals (e.g. customer and/or employees) as well as further information on the individuals such as their titles, emails, managers and departments within the organisation, time in the organization. It will be appreciated that this is a non-exhaustive list and any other information on users (individuals) within the environment will be extracted. An organisational tree structure may be built using this information. The organisation database with the tree structure may thus be termed a users' and customers' organisational database. The data within this database may be updated regularly, e.g. every hour. Any suitable technique may be used to gather and update the information within the database, for example suitable techniques are described in U.S. Pat. No. 9,286,316 which is hereby incorporated by reference.

The image database 302 may also be built using images within the organisation database together with images collected from other applications used within the environment, e.g. applications which enable video messaging such as Zoom®, Teams® and Slack®. The images within the image database 302 may be encoded in any suitable format, e.g. as a vector embedding. The images are stored together with an identifier for the individual. Such an identifier can be readily extracted from a typical messaging application when users have each enabled their individual cameras during the call, each face is shown within the video captured by the individual camera with the user's displayed name. When multiple users are shown in the same video feed, any displayed name may not be a simple match for the visible users. In this case, the video feed may be analysed to detect or extract images/frames in which there is only one speaker and other data may be used (e.g. a photo from a directory or database) to cross-check with the detected or extracted images before adding the user identifier. By ensuring that there is a match between the video feed and other data, we can ensure that correct user identifiers are created. The user identifier and image will be collected and uploaded to the image database 302 to form a database of labelled face data. The labels will contain the user's display name within the messaging application and the username and ID, as in the identity management systems.

Similarly, the sound signature database 304 may be built using audio files stored within the organisation database together with audio files collected from other applications used within the environment, e.g. applications which enable video calls. It will be appreciated that audio files can sometimes be captured without video, e.g. when a user does not turn on their camera. The audio files will be labelled in a similar manner to those of the image files. The sound signature database 304 and the image database 302 may be used to identify a person (individual) within a received video.

The description database 306 may be a vector database and may comprise examples of text descriptions and the inputs which are used to create them, for example the video as well as labelled transcripts and information about the individuals. The security database 310 may also be a vector database and may comprise example text descriptions with the classification labels. The text description may be tokenized to generate pieces of text and embeddings may be created for each tokenized piece of text. The embeddings may then be stored as a vector. Prompts may be generated from the description database 306 for the description module and similarly prompts for the LLM classifier may be generated from the security database 310 as explained in more detail below. The text descriptions may have been generated by the description module 122 (or manually when building training data). The classification label for each text description and optionally the reasons explaining the classification label may have been generated by the LLM classifier (or manually when building the training data) as explained in more detail below. Both the description and security database may be kept updated even after the models which access the databases are fine-tuned. For example, by including recently generated text descriptions and associated classifications in the security database 310, relevant and up-to-date examples may be used to help the LLM classifier make a decision. These examples may be added to the prompt as "here are similar examples that might help".

It will be appreciated that the databases shown in FIG. 1 are not exhaustive and other databases may be created. For example, there may be a database of metadata about files within the system. The metadata may include, for example who created a file, who accessed it, who shared it, any editing of the file, modifying the access permissions of the file and so on. This metadata may be present on the file, and can be extracted, using a metadata extractor, when the file is received for analysis. Additionally, the metadata may not be present on the file such as the past file accesses and may be extracted from other information which is related to the file such as the creation of a shared link to a document or by tracking other events from the device file system and cloud-based collection systems (such as Dropbox, SharePoint Online and Google Drive). Any suitable technique for extracting the metadata may be used and merely as examples, suitable techniques are described in US2009/265780 and U.S. Pat. No. 8,578,507 which describes monitoring and recording data access events and which are hereby incorporated by reference. This additional extracted metadata may also be input to the rules-based classifier.

Another example of a database which may be created is a message database which collects any messages or posts which have been written before or around the time that the video is uploaded. The messages or posts may be collected from any suitable application, including the messaging applications mentioned above. The information in the message database may be input to the rules-based classifier and/or the LLM classifier. An example of a message could be "I'm starting a screen share for Q4 results in a minute" which would indicate that the subsequent video file of the screen share is likely to be sensitive. The message could be in a file which separate from the video file or extracted from within the video file.

Returning to FIG. 2, the next step S202 is for the server to receive a video from the electronic device. The video may be received as a result of policies which have been created to control data upload or transmission. Such policies may control exit points from the network such as email gateways and/or proxies and instruct such exit points that any video which an electronic device is attempting to send outside the environment must be analysed, and classified, so that transmission can be controlled. For example, the user may be attempting to transmit the video using any suitable technique, e.g. using and instant messaging; email; upload to an external platform; upload to a social media platform. Alternatively, the video may have been received because it has been newly created or obtained by the electronic device and its sensitivity is unknown. There may be policies which have been created to ensure that all files within the environment are classified as sensitive or non-sensitive.

At step S204, data relating to the video may be obtained, for example metadata may be extracted from the video file or otherwise obtained and text data within the video may also be extracted. At step S205, a labelled transcript of any speech within the video is generated as explained in more detail below. Steps S204 and S205 are shown as being carried out simultaneously but step S204 may be done before step S205 when the metadata (or other data) can be used to generate the labelled transcript. Step S204 may also include obtaining from the organisation database information about each identified individual and may thus be done after the creation of the labelled transcript. The generation of the labelled transcript may include identification of any individual present (visually or audibly) in the video. The generation of the labelled transcript may use the information in the databases and some of the modules shown in FIG. 1. Example methods for identifying the individual(s) are detailed below. When identifying an individual, it is not merely their name which may be identified but also an identification of their role within the organisation (e.g. VP of Sales, Software Engineer, etc). At step S206, a detailed text description of the received video is generated, for example using a description module in the form of a fine-tuned generative AI. The description describes the content of the video file. The description may be generated using the video file as an input together with additional data from the video file itself, metadata, information about identified individuals and a labelled transcript which may be in turn be determined from the identity providers and CRM systems as described in more detail below. The generated description and its input video file may be stored in the description database so that the description database contains relevant and up-to-date examples.

The additional data may be termed a prompt. Prompt engineering is a known technique for structuring text so that it can be understood by a generative AI model. It is known to generate prompts in the form of natural language texts which describe the task that an AI should perform. The prompts may include the labelled speech segments (labelled transcript) which are generated as described in FIG. 3, any text data which has been extracted for example using OCR, any metadata which is extracted from the video file itself or using any other techniques and/or any messages which have been collected and could be associated with the video. Additionally, the additional prompts may comprise information about individuals who are not within the organisation but are related to the organisation, e.g. customers as well as information relating to individuals within the organisation. This may be taken from the organisation database as explained above. This final prompt may be considered to be a data enrichment step.

The prompts may also be selected from examples in the description database (which may include the training data used to train the model used by the description module as well as more up-to-date data). The prompts may be selected by choosing examples which are relevant to the video which is to be input. For example, the prompts may be selected using any suitable method such as retrieval augmentation generation (RAG). RAG typically augments the prompts with additional relevant context, e.g. the selected example from the database. Selection may be done using any suitable comparison technique, for example the videos may be expressed as a vector of features, and then the vectors may be compared by checking the cosine similarity of the current video to videos in the description database. When the vectors are based on tokenized pieces of text as described above, the generated text-based summary may be tokenized in a similar manner and RAG may be used with the relevant vector(s) based on the tokenized text. By using RAG or similar techniques, the model will use the additional relevant context as facts rather than pre-trained outdated information which might cause hallucinations.

At steps S208 and S210, there are two separate classifications of the received video. The classifications may indicate whether a video is sensitive, e.g. to be held secret within the organisation, or non-sensitive. They are shown as being done simultaneously but it will be appreciated that they may be done sequentially. A first classification at step S208 uses the description of the video as an input to a second fine-tuned generative AI or LLM classifier. In a similar manner to the prompt techniques described above for the first generative AI model, retrieval augmented generation techniques may be used to retrieve additional examples which are used as prompts.

These prompts may be selected from examples in the security database. The prompts may be selected by choosing examples which are relevant to the text description which is to be input to the LLM classifier. For example, the prompts may be selected using retrieval augmentation generation (RAG) for example by checking the cosine similarity of the current text description to text descriptions in the security database, wherein the text descriptions are both expressed as vectors. Other suitable techniques may be used, including for example semantic similarity and key-word based filtering.

A second optional classification at step S210 uses a rule-based system to check if the received video contained sensitive text. Any suitable rule-based system may be used to classify the video and any suitable inputs can be used in the rule-based classifier. For example, the description of the video can be input to the rules-based classifier. The rules may be based on data within the description and/or metadata which has been collected. For example, the rules-based classifier determines whether any sensitive data, e.g. a social security number, is mentioned in the description and if so, labels the video as sensitive. Alternatively, or additionally, the rules may be defined by the organisation. For example, a rule may define that any VP sales mentioned in the description mean that the video is to be classified as sensitive and/or a rule may define that if the VP Sales created the video, it is to be classified as sensitive. Other metadata and/or data may be used in the rules-based classifier to classify the video as sensitive, for example as described in U.S. Pat. Nos. 10,037,358 and 10,296,596 which are hereby incorporated by reference.

At step S212, there is a determination as to whether the video should be classified as sensitive. The video will be classified as sensitive when either the LLM classifier or rule-based classifier classify it as sensitive. The video will be tagged with a classification at steps S214 and S216. A notification of the classification may also be sent to the user and the notification may be displayed on the user's electronic device. The notification may alternatively or additionally be sent to a system administrator (CISO) and/or audit system.

When a video is classified as sensitive, at step S218, any transmission of the video outside the environment may be controlled or restrictions placed on the transmission. The control or restrictions may be automatically imposed or may be imposed by the CISO or the user. When the video is not classified as sensitive, at step S220, transmission of the video may be permitted. Controlling transmission may comprise blocking, e.g. preventing transmission outside the network or may comprise editing or recommending edits to the video. the video may be edited, namely changed, for example to blur or remove any individual frames which may be sensitive and/or to alter, e.g. muffle, any audio content in individual frames which may be sensitive. The individual sensitive frames may also be flagged to a user so that they can then edit the video before repeating their attempt to transmit the video. As shown in step S222, there may be record stored in an audit log. The record can log both approved and denied transmissions. Such an audit log may be used to ensure compliance with data privacy and security of data.

An illustrative example is provided. An employee (i.e. an individual within the organisation's environment) took a short video from an electronic device, in this case a mobile phone. The employee tried to upload it to social networks. The phone was connected to the company VPN, and is controlled by company policies and thus the video was sent to the server for analysis before uploading to the social networks.

The video was showing the CFO in one frame, and a whiteboard with numbers in a different frame. The CFO can be identified in the video using the techniques outlined above. The white board with numbers will be described in the text description of the video. These two inputs to the LLM classifier will result in a classification label of sensitive on the basis that the CFO was near a whiteboard filled with numbers and the numbers are likely to represent sensitive financial data of the company. The user will thus be prevented from uploading the video to social media or may be provided with an edited version of the video which is suitable for uploading.

Figure 3:
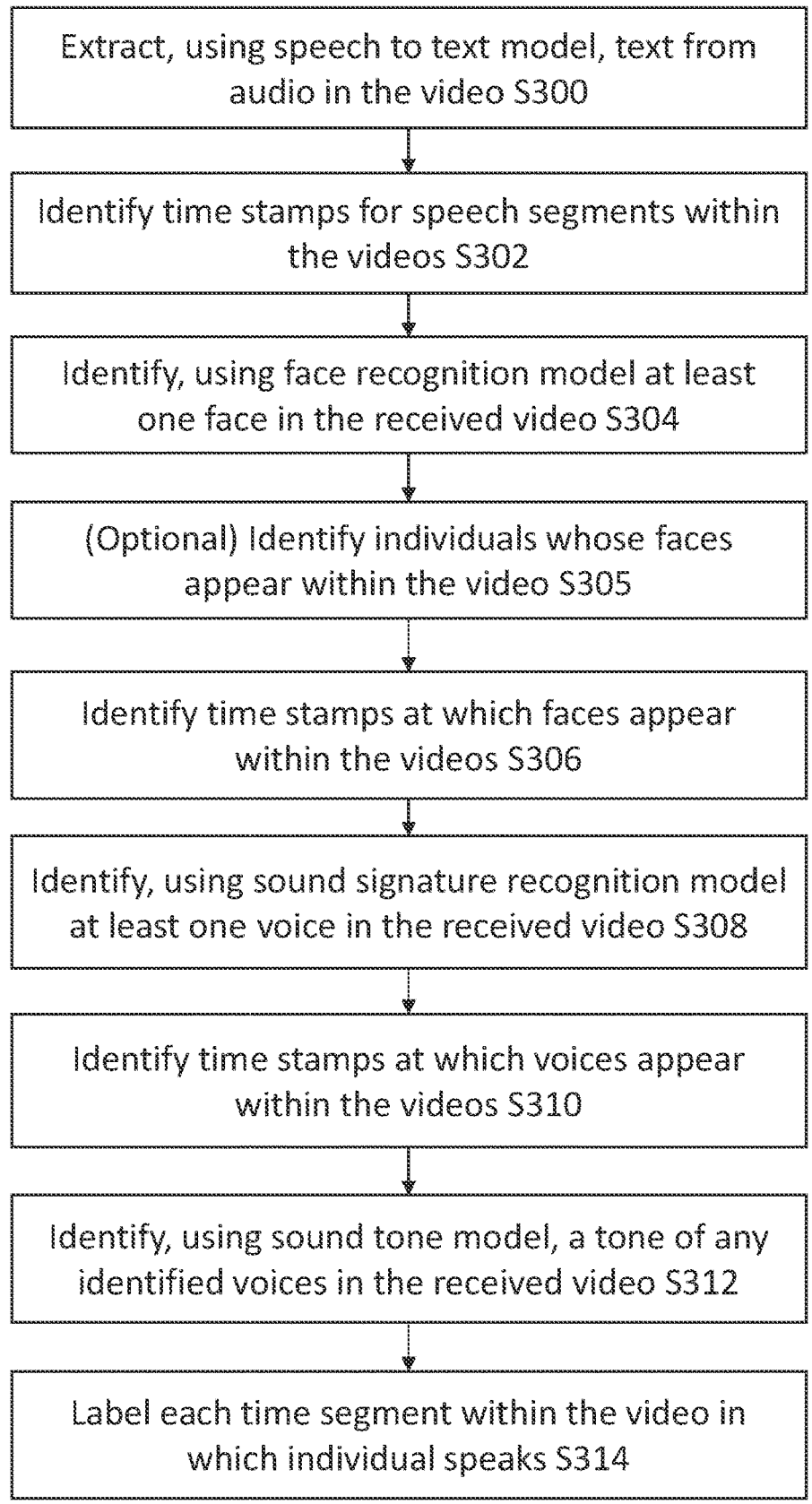
FIG. 3 is flowchart showing the steps in generating a labelled transcript which may be used in the method of FIG. 2.

FIG. 3 is a flowchart illustrating how individuals who are speaking in the video may be identified and the labelled transcript may be generated. FIG. 3 may be termed a data extraction phase and the data may be extracted after the video is received by the server and before a video is uploaded outside the environment by the electronic device. In a first step S300, we will use a speech-to-text model to extract the text (i.e. the transcript) from the audio in the video. Such speech to text models are standard and examples include Whisper (created by Open AI) and Massively Multilingual Speech (MMS) project by Meta. The chosen model might be different for different environments, for example a multi-lingual model to overcome limits such as Zoom® not supporting certain languages (such as Hebrew). At step S302, the time stamps for speech segments, e.g. sentences, within the text are also identified.

At step S304, a face recognition model will be used to identify any faces in the received video. Optionally, at step S305, as part of this data extraction phase, the individual associated with the identified faces are also identified. Face recognition models are well known and deep-learning methods such as Single Shot MultiBox Detector (SSD) may be used. Such face recognition models may be used to detect faces within the video and generate an image feature representation. The generated feature representations may then be compared to the corresponding feature representations in the image database described above, whereby the identity (e.g. names) of the faces are also identified, not just the presence of the faces. At step S306, the time stamps for the face segments, e.g. the segments in which faces are present, are also identified.

At step S308, a sound signature recognition model will be used to identify any voices in the received video (i.e. to identify any audible speech). At step S310, the time stamps for the audio speech segments are also identified. Sound recognition models are also well known. For example, algorithms such as Hidden Markov Models (HMMs) may be used to analyse dynamics of speech such as speed, pitch, volume. Algorithms such as Gaussian Mixture Models (GMMs) may be used to decide who are the speaker. At step S312, there is an optional step of identifying a tone or sentiment of any identified voices using a sound tone model. Algorithms such as Mel-frequency Cepstral Coefficients (MFCC) may be used to detect the speaker emotions. Thus, the sound recognition model(s) may be used to detect speech segments within the video and generate an audio feature representation for each speech segment. The generated audio feature representation may then be compared with audio feature representations in the database of individuals linked to the environment (i.e. within the audio database described above).

More generally, one or all of the speech-to-text model, the face recognition model, the sound tone model and the sound recognition model may be a machine learning model (also termed an artificial intelligence AI model). As is well known, such models may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

At step S314, all the information which is gathered in steps S300 to S310 is combined to label any speech segments in which an individual within the environment is speaking and thus generate a labelled transcript. The segments may be labelled with the names of the individuals who are speaking and/or present as well as timestamps and any detected emotions or tones. It will be appreciated that the information is steps S300 to S312 may be extracted in any order and may be extracted simultaneously. In addition to the data which is extracted above, when an auto-generated transcript is available, for example as created automatically in some messaging applications such as Zoom®, the auto-generated transcript may also be used at step S312. Such an auto-generated transcript may thus be used in addition to, rather to replace, the information gathered in steps S300 to S310.

Figure 4:
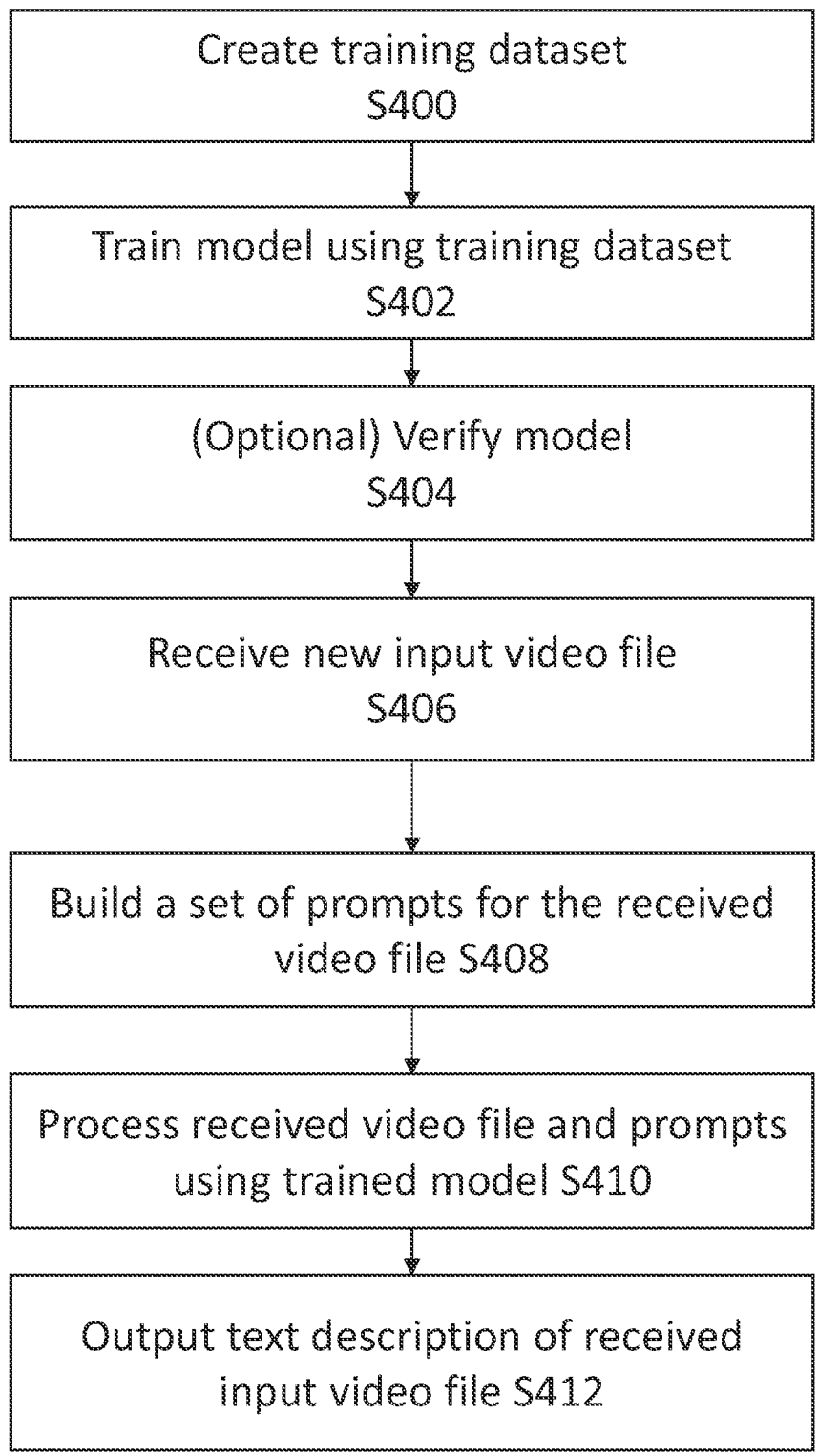
FIG. 4 is a flowchart showing how a first generative AI model which may be used in the method of FIG. 2 may be trained and then used.

FIG. 4 is a flowchart showing the steps for training, particularly fine-tuning, a generative machine learning model to function as the description module and generate a text description of the received video which can then be input to the LLM. Generative machine learning models are known in the art may be used to generate text and/or images. A generative machine learning model typically learns the patterns and structure of their input training data to generate new data with similar characteristics. Generative AI is a subset of artificial intelligence that focuses on creating new, previously unseen content. These models are trained on large amounts of data, allowing them to learn patterns and structures inherent in the data, and then generate similar but novel content.

In a first step S400, a training dataset is created and may be stored in the description database. The training dataset comprises a large set of examples which comprise a plurality of inputs as well as the output text description for the inputs. It will be appreciated that thousands of examples are likely to provided better results than hundreds. However, the size of the training dataset will be dependent on the quality of each example within the dataset as well as the desired quality of the results and the balance of examples in the training dataset. A training dataset ideally needs to be balanced, namely represent each feature/class in a balanced way.

The text description describes the video file. The output text description may have various specified components to ensure that there is consistency from one text description to another. As examples the components may relate to individuals within the video, for example: an indication of which individual (particularly) employees are present in the video, the roles of any employees present in the video, for each individual, who and what they interacted with in the video, any specific behaviour of the individuals, the main presenter in the video, the number of people within the video, the presence of any individuals who are not within the organisation and/or the presence of any information about such individuals. The components may also comprise contextual information about the video, for example: the location in which the video was recorded, presence of specific objects (e.g. whiteboards/screens), presence of any specific terminology (e.g. confidential, proprietary, internal-use only), presence of any specific visual cues (e.g. closed doors, "do not disturb" signs or security personnel), presence of any company logos (particularly in unusual locations), video quality, and/or types of documents (e.g. non-disclosure agreement (NDA) or financial documents). For training purposes, the output text description for each example in the training data may be generated manually.

Merely as an example, one text description is provided below. The general text description is "The video is a 15-minute recording of a closed-door meeting in the boardroom of XYZ Corp. The main speaker is John Doe, the VP of Sales, who has been with the company for over 10 years. He is seen standing next to a whiteboard with various numbers and graphs, which appear to be sales forecasts and revenue figures for the upcoming quarter. The video quality is high, suggesting it was recorded professionally. There are also glimpses of documents on the table, which seem to be financial reports. In the background, there's a visible company logo and a screen showing a slide titled 'Confidential: Q4 Strategy'. John occasionally glances at a document labelled 'NDA Agreement' while speaking in serious tones about meeting targets and upcoming product launches. The video file metadata shows it was created late at night." Example of specific components which can be included as part of the output text description are listed in the table below:

the trained model may be verified at step S404, for example using a portion of the training dataset (e.g. 10%) which was reserved for verification purposes.

Once the model has been tuned, the model can then be used by the server to create text descriptions for new input video files. At step S406, a new input video file is received. All the prompts which are to be included with the video file as inputs to the model are then generated at step S408. These prompts may include some or all: the labelled speech segments which may have been generated as described in FIG. 3, any extracted text data, any collected/extracted metadata and/or database information about individuals within the video. The prompts may also include examples from the description database obtained using RAG as described above. At step S410, the newly received video file is processed using the trained model together with the generated prompts. At step S412, the text description is output, for example as a list of components and/or as a continuous piece of text. The output text description together with the input video for which the text description was generated may then be stored in the description database, e.g. as a vector, so that the description database contains up-to-date examples which can be extracted as prompts.

Figure 5:
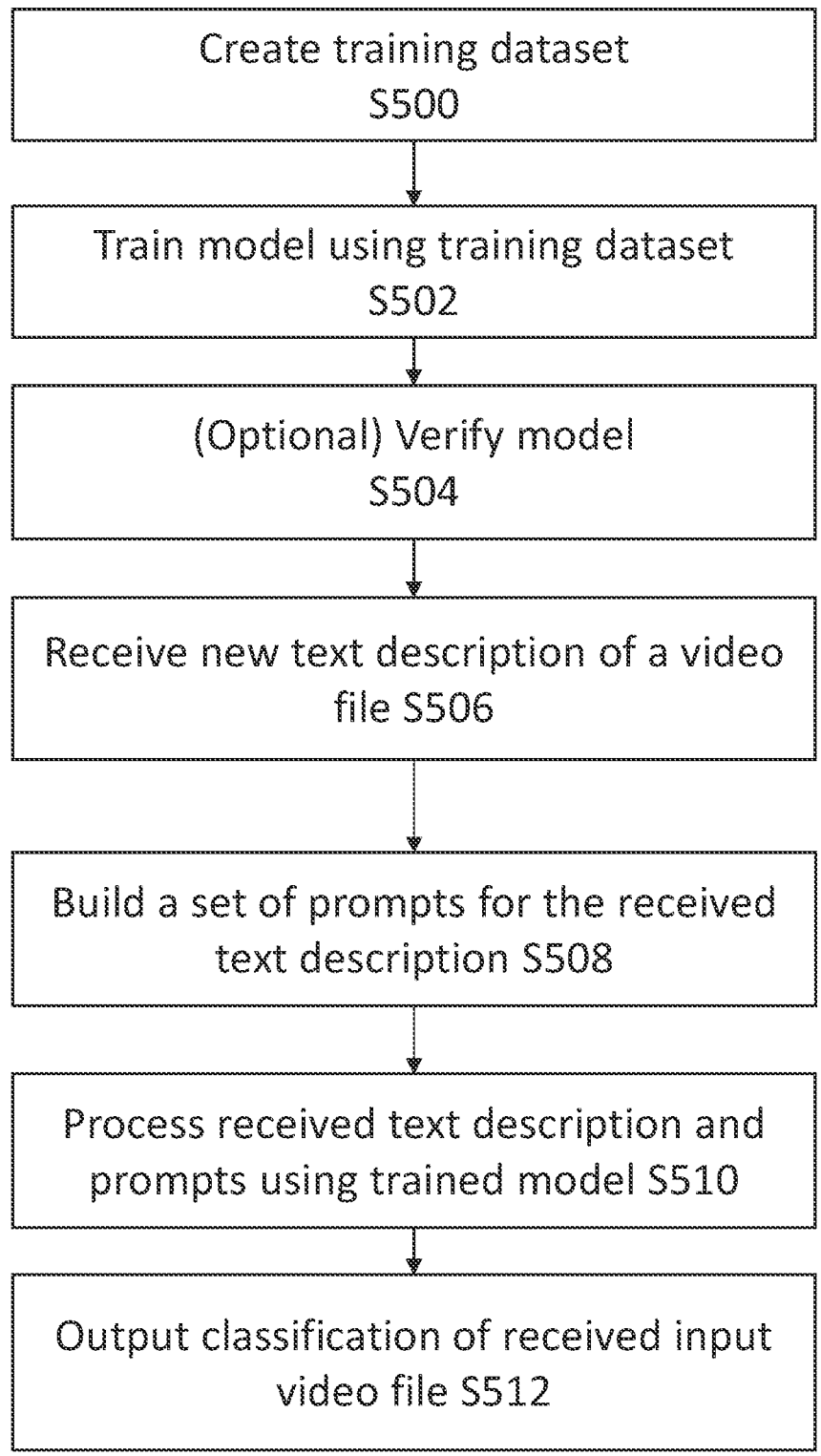
FIG. 5 is a flowchart showing how a second generative AI model which may be used in the method of FIG. 2 may be trained and then used.

FIG. 5 is a flowchart showing the steps for training, particularly fine-tuning, a generative machine learning model to function as the LLM classifier which classifies the received video as sensitive/not sensitive. In a first step S500, a training dataset is created and may be stored in the security database. The training dataset may be created based on the training dataset which was created in FIG. 4. For training the LLM classifier, the input for each example is primarily the text description which is generated using the method described for example in FIG. 4. The input text description is annotated (labelled) with an output in the form of a classification label, e.g. sensitive or not sensitive. The input may also be annotated with an output which gives reasons for the classification label which has been assigned. These annotations may be done manually and may be considered to be an extension of the annotations (outputs) in the training dataset used in training the description module.

The output reasons may be the main reasons (e.g. top three reasons) for the classification label. Referring to the example above, the classification label may be sensitive, and the main reasons may be listed as:

| Component | Description |
|---|---|
| Speaker's role | The main speaker is the VP of Sales. |
| Location | The video was shot in a boardroom |
| Presence of whiteboards/screens | The speaker is standing next to a whiteboard with numbers and graphs. |
| Text content of whiteboards/screens | The whiteboard and screen show sales forecasts, revenue figures, and a slide titled 'Confidential: Q4 Strategy'. |
| Document type | There are glimpses of what seem to be financial reports |
| Company logo | The company logo is visible in the background |
| Speaker's behaviour | The speaker speaks in serious tones about meeting targets and upcoming product launches. |
| File metadata | The video was created late at night |
| NDAs | The speaker occasionally glances at a document labelled NDA |
| Video quality | The video quality is high, suggesting it was recorded professionally |

As shown at step S402, the text description module is then trained (or tuned) using the training data. Any suitable training method may be used, for example by minimising loss from a loss function over the training data. Optionally, 1. Confidential Information: The video contains a discussion about sales forecasts and revenue figures for the upcoming quarter, which are typically considered confidential in a business setting.

2. Presence of High-Ranking Executive: The main speaker in the video is the VP of Sales, a high-ranking executive, which increases the likelihood of sensitive topics being discussed.
3. Late Night Recording: The metadata shows that the video was created late at night, suggesting it might have been a private or confidential meeting."

As shown at step S502, the LLM classifier is then trained using the training data. Any suitable training method may be used. Optionally, the trained model may be verified at step S504, for example using a portion of the training dataset (e.g. 10%) which was reserved for verification purposes.

Once the model has been trained, the model can then be used by the server to create a classification label for a new input video file and optionally a list of reasons for the classification. At step S506, a new input text description of the new video file is received. This text description may be generated from the video file as described above. Additionally, the prompts which are to be included with the text description as inputs to the LLM classifier are then generated at step S508. The prompts may include examples from the security database obtained using RAG as described above.

At step S508, the newly received text description is processed using the trained model together with the generated prompts. At step S510, the classification label and optionally reasons for the classification are output, for example as a list of reasons. The output classification label together with the input text description for which the classification was generated may then be stored in the security database, e.g. as a vector, so that the security database contains up-to-date examples which can be extracted as prompts.

As examples the reasons may be based on individuals within the video, for example: the presence of a high-ranking employees, specific sensitive behaviour of the individuals, the presence of any information about any individuals who are not employees (e.g. customers). The reasons may also be based on contextual information derived from the video, for example: the location in which the video was recorded being sensitive, presence of any specific sensitive terminology (e.g. confidential, proprietary, internal-use only), presence of any specific visual cues (e.g. closed doors, "do not disturb" signs or security personnel), presence of any sensitive types of documents (e.g. non-disclosure agreement (NDA) or financial documents) and timing of recording.

As detailed above, determining the sensitivity of videos and then controlling transmission of sensitive videos is a multidimensional problem and an accurate analysis may need metadata as well as the video's content (text, audio, pictures) and data about the organisational structure of the environment within which sensitive data must remain.

Figure 6:
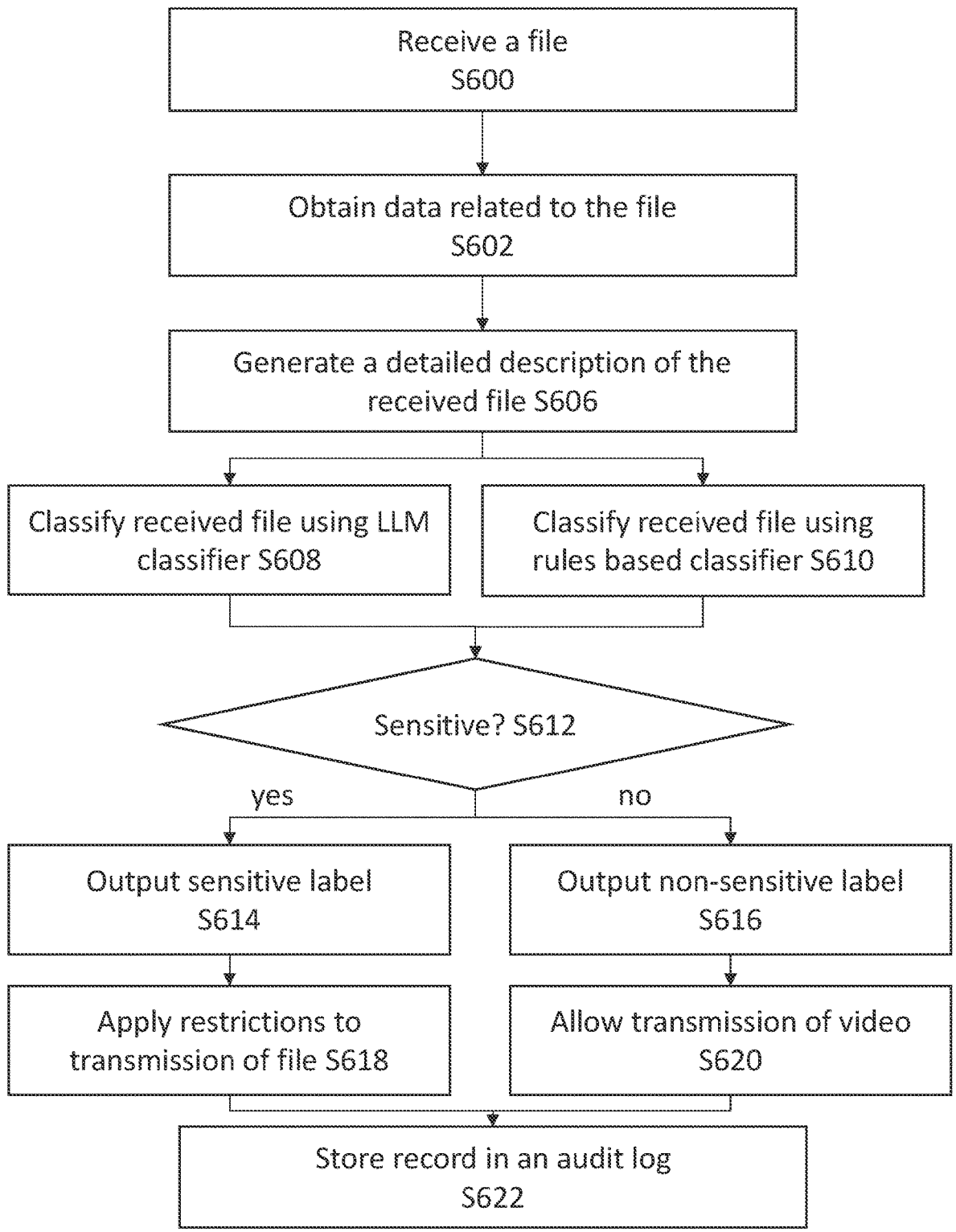
FIG. 6 is a flowchart showing how the method of FIG. 2 can be adapted for any file.

The detailed example above, focusses on a video file but it will be appreciated that similar processes can be applied to any type of document. FIG. 6 outlines a process for classifying and optionally applying restrictions to the transmission of the file outside of the environment which is in line with the method and system described above. The necessary databases are built as described in detail above. At a first step S600, a file is received at the server. The file may be received as result of an attempted transmission outside the environment or as a result of a request to be classified. The file may be any type of file, for example a text document.

At step S602, data relating to the file may be obtained, for example metadata may be extracted from the file or otherwise obtained and text data within the file may also be extracted. The data obtained at step S602 may also include data related to any individuals who are mentioned in the file or otherwise connected to the file, e.g. created, sent, received and/or accessed the file. Thus, there may also be a step of analysing the file to identify any individuals connected with the file. At step S606, a detailed text description (i.e. a text-based summary) of the received file is generated, for example using a description module in the form of a fine-tuned generative AI such as those described above including GPT-4 or LLaMA2.

At steps S608 and S610, there are two separate classifications of the received file. The classifications may indicate whether a file is sensitive, e.g. to be held secret within the organisation, or non-sensitive. They are shown as being done simultaneously but it will be appreciated that they may be done sequentially in any order. A first classification at step S608 uses the description of the file as an input to a second fine-tuned generative AI or LLM classifier such as those described above including LLaMA2. A second (optional) classification at step S610 uses a rule-based system to check if the received file contained sensitive text. The rules-based system may be similar to the one described above but adapted for the type of file received rather than a video.

At step S612, there is a determination as to whether the file should be classified as sensitive. The video will be classified as sensitive when either the LLM classifier or rule-based classifier classify it as sensitive. The video will be tagged with a classification at steps S614 and S616. Notifications may be sent out as described in relation to FIG. 2. When a video is classified as sensitive, at step S618, any transmission of the video outside the environment may be restricted, e.g. by preventing the transmission or only allowing transmission of an edited version of the file in which sensitive material has been removed or concealed. Editing may be done by a user or a CISO. When the file is not classified as sensitive, at step S620, there may be no restrictions placed on the file and thus transmission of the file may be permitted within or outside the environment. As shown in step S622, there may be record stored in an audit log. The record can log both approved and denied transmissions. Such an audit log may be used to ensure compliance with data privacy and security of data.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What claimed is:
1. A computer-implemented method for determining a sensitivity classification of a video, the method comprising:
 receiving, at a central system, a video from an electronic device which is connected to the central system and forms an environment within which the video is located;
 analysing, using at least one machine learning model, the video to recognise any individuals in the video;
 obtaining a transcript of any speech in the video;
 generating, using the recognised individuals in the video, obtained transcript and a database of individuals linked to the environment, a labelled transcript which identifies each individual linked to the environment that is in the video;

obtaining, from an organisation database which is connected to the central system and which contains, for each individual linked to the environment, details about each individual which are relevant to the environment, information about each identified individual;

generating, using a first generative artificial intelligence (AI) model, a text-based summary of the video by using the labelled transcript and information about each identified individual obtained from the organisation database as prompts to the first generative AI model;

determining, using a second generative AI model, a sensitivity classification of the video using the text-based summary generated by the first generative AI model; and outputting the determined sensitivity classification.

2. The method of claim 1, further comprising:
using an optical character recognition module to extract any text from frames of the video; and
using the extracted text as a further prompt when generating the text-based summary of the video.

3. The method of claim 1, further comprising:
obtaining, using a meta data extractor module, metadata related to the video; and
using the metadata as a further prompt when generating the text-based summary of the video.

4. The method of claim 1, wherein, prior to using the first generative AI model, the first generative AI model has been trained using a training dataset which comprises example videos and the text based summaries for the example videos and the method further comprises:
using the text based summaries together with the example videos as further prompts when generating the text-based summary of the video.

5. The method as claimed in claim 1, wherein, prior to using the second generative AL model, the second generative AI model has been trained using a training dataset which comprises example text-based summaries and classifications for the example text-based summaries and the method further comprises:
using the text-based summaries and classifications as further prompts when generating the sensitivity classification for the video.

6. The method as claimed in claim 1, further comprising selecting a prompt to use when generating the sensitivity classification using the second generative AI model by:
comparing the generated text-based summary to a plurality of example text-based summaries in a security database which comprises example text-based summaries and classifications for the example text-based summaries;
identifying at least one example from the plurality of example text-based summaries which is similar to the generated text-based summary; and
selecting the identified at least one example as the prompt.

7. The method as claimed in claim 1, further comprising:
determining, using the obtained text-based summary, a sensitivity classification of the video using a rules-based engine to analyse the text-based summary, wherein rules of the rules-based engine are pre-defined for the environment.

8. The method as claimed in claim 1 wherein analysing, using at least one machine learning model, comprises analysing an image portion of the video using a face recognition model to recognise faces of any individuals in the video.

9. The method as claimed in claim 8 wherein analysing an image portion of the video to recognise faces comprises:
detecting, using the face recognition model, faces within the video; and
generating, for each detected face, an image feature representation.

10. The method as claimed in claim 9 further comprising:
comparing the generated image feature representation for each detected face with image feature representations in an image database of the database of individuals linked to the environment; and
when the generated image feature representation matches an image feature representation in the image database, outputting an identification of the individual corresponding to the matching image feature representation.

11. The method as claimed in claim 1 wherein analysing, using at least one machine learning model, comprises analysing, using a sound recognition model, an audio portion of the video to recognise individuals who are speaking in the video by:
detecting, using the sound recognition model, speech segments within the video; and
generating, for each speech segment, an audio feature representation.

12. The method as claimed in claim 11 further comprising:
comparing the generated audio feature representation for each speech segment with audio feature representations in an audio database of the database of individuals linked to the environment; and
when the generated audio feature representation matches an audio feature representation in the database of individuals, outputting an identification of the individual corresponding to the matching audio feature representation.

13. The method as claimed in claim 1 wherein obtaining a transcript of any speech in the video comprises using a speech-to-text model to generate a transcript from the received video.

14. The method as claimed in claim 1 wherein obtaining, from the organisation database, information about each identified individual comprises obtaining information on any one or more of: a relationship of the identified individual to the environment; a role of the identified individual in the environment; and a name of the identified individual.

15. A computer-implemented method for controlling transmission of a video outside of an environment in which the video is located, the method comprising:
receiving, at a central system in the environment, a video from an electronic device which is connected to the central system;
analysing, using at least one machine learning model, the video to recognise any individuals in the video;
obtaining a transcript of any speech in the video;
generating, using the recognised individuals in the video, obtained transcript and a database of individuals linked to the environment, a labelled transcript which identifies each individual linked to the environment that is in the video;
obtaining, from an organisation database which is connected to the central system and which contains, for each individual linked to the environment, details about each individual which are relevant to the environment, information about each identified individual;
generating, using a first generative artificial intelligence (AI) model, a text-based summary of the video by using the labelled transcript and information about each identified individual obtained from the organisation database as prompts to the first generative AI model;

determining, using a second generative AI model, a sensitivity classification of the video using the text-based summary generated by the first generative AI model; and controlling transmission of the video based on the determined sensitivity classification.

16. The method as claimed in claim 15 wherein controlling transmission of the video based on the determined sensitivity classification comprises one or more of:

blocking transmission of the video outside of the environment and editing the video prior to transmission outside of the environment.

17. A computer-implemented method for determining a sensitivity classification of a file, the method comprising:

receiving, at a central system, a file from an electronic device which is connected to the central system and which forms an environment within which the file is located;

analysing the file to identify any individuals connected with the file;

obtaining, from an organisation database which is connected to the central system and which contains, for each individual linked to the environment, details about each individual which are relevant to the environment, information about any identified individual;

generating, using a first generative artificial intelligence (AI) model, a text-based summary of the file by using the information about each identified individual obtained from the organisation database as a prompt to the first generative AI model;

determining, using a second generative AI model, a sensitivity classification of the file using the text-based summary generated by the first generative AI model; and outputting the determined sensitivity classification.

18. A central system for determining a sensitivity classification of a video, the central system comprising:

an interface which is for connecting the central system to an electronic device and through which a video is receivable from the electronic device;

at least one machine learning model for analysing the video to recognise any individuals in a received video;

a transcript module for obtaining a transcript of any speech in the received video and for generating a labelled transcript using the obtained transcript, individuals in the video recognised by the at least one machine learning model and data from a database of individuals linked to the environment, wherein the labelled transcript identifies each individual linked to the environment that is in the video;

a first generative artificial intelligence (AI) model for generating a text-based summary of the video, wherein the labelled transcript and information about each identified individual are used as prompts to the first generative AI model when generating the text-based summary and wherein the information about each identified individual is obtained from an organisation database which is connected to the central system and which contains, for each individual linked to the environment, details about each individual which are relevant to the environment; and a second generative AI model for generating a sensitivity classification of the video using the text-based summary generated by the first generative AI model.

19. The central system as claimed in claim 18, further comprising a security database comprising a plurality of example text-based summaries and classifications for the example text-based summaries expressed as vector of features and wherein at least one of the example text-based summaries is selected as a prompt to use when generating the sensitivity classification using the second generative AI model by:

comparing the text-based summary generated by the first generative AI model to the plurality of example text-based summaries in the database;

identifying at least one example from the plurality of example text-based summaries which is similar to the generated text-based summary; and selecting the identified at least one example and its classification as the prompt.

20. The central system as claimed in claim 18, further comprising a description database comprising a plurality of example videos and text based summaries for the example videos expressed as vector of features and wherein at least one of the text based summaries for the example videos is selected as a prompt to use when generating the text-based summary using the first generative AI model by:

comparing the received video to the plurality of example videos in the database;

identifying at least one example from the plurality of example videos which is similar to the received video; and selecting the text based summary for the identified at least one example as the prompt.

* * * * *